United States Patent [19]

Okada

[11] Patent Number: 6,026,295
[45] Date of Patent: *Feb. 15, 2000

[54] MOBILE COMMUNICATION SYSTEM AND BASE STATION

[75] Inventor: Yasushi Okada, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/522,022

[22] Filed: Aug. 31, 1995

[30] Foreign Application Priority Data

Feb. 27, 1995 [JP] Japan .................................. 7-037918

[51] Int. Cl.[7] ...................................................... H04Q 7/30
[52] U.S. Cl. ........................... 455/416; 455/435; 455/445
[58] Field of Search ................................ 379/58, 59, 60, 379/63; 455/34.1, 33.1, 33.2, 445, 416, 463, 435

[56] References Cited

U.S. PATENT DOCUMENTS

| | | | |
|---|---|---|---|
| 4,878,740 | 11/1989 | Nagashima et al. | 379/60 X |
| 4,955,050 | 9/1990 | Yamauchi | 379/63 X |
| 5,191,593 | 3/1993 | McDonald et al. | 455/463 |
| 5,257,410 | 10/1993 | Meszko et al. | 455/78 |
| 5,295,179 | 3/1994 | Asahara et al. | 379/58 |
| 5,463,672 | 10/1995 | Kage | 455/458 |
| 5,479,483 | 12/1995 | Furuya et al. | 379/59 X |
| 5,509,052 | 4/1996 | Chia et al. | 379/60 X |
| 5,524,045 | 6/1996 | Yazawa | 379/58 |
| 5,598,412 | 1/1997 | Griffith et al. | 370/352 |
| 5,613,196 | 3/1997 | Barnes et al. | 455/34.1 X |
| 5,835,860 | 11/1998 | Diachina | 455/567 |
| 5,926,760 | 7/1999 | Khan et al. | 455/435 |

FOREIGN PATENT DOCUMENTS 3-211926   9/1991   Japan .

*Primary Examiner*—David R. Hudspeth
*Assistant Examiner*—Martin Lerner
*Attorney, Agent, or Firm*—Helfgott & Karas, P.C.

[57] ABSTRACT

A mobile communication system in which a mobile station communicates through a base station connected to a switch system is proposed. In the system, the base station includes a registration memory registering a mobile station located in an area defined by the base station, a switch processing part performing switching and connecting, and a control part. The control part includes a configuration controlling the switch processing part to connect a calling mobile station and a called mobile station in the area.

15 Claims, 12 Drawing Sheets

MOBILE COMMUNICATION SYSTEM AND BASE STATION

BACKGROUND OF THE INVENTION

1. Field of the Invention

The present invention generally relates to a mobile communication system and a base station, and more particularly, to a mobile communication system and a base station in which communications are carried out by mobile station equipment for a personal handy phone system in Japan, etc.

Mobile telephones and portable telephones are now widely used, and further, a personal handy phone system (PHS) service has been provided for commercial use in Japan since 1995. The personal handy phone system has a feature that configurations of mobile station and base station equipment are simpler as compared to the conventional automobile and portable telephone systems. Transmission power of portable station equipment in the personal handy phone system is around 10 mW. A usage frequency band for communication between the base station and the portable station is a 1.9-GHz band. A speech coding method used in the system is ADPCM (Adaptive Differential Pulse-Code Modulation) of 32 kbps. And a TDMA/TDD (Time-Division Multiple Access/Time-Division Demand) method is applied to an access method of the system. In such a mobile communication system, an effective operation of the base station is desired.

2. Description of the Prior Art

FIG. 1 shows a configuration of the personal handy phone system (PHS) in Japan. In FIG. 1, numerals 71-1 to 71-4 indicate base stations (CS), a numeral 72 indicates a portable station which is commonly referred to as a mobile station, a numeral 73 indicates a private branch exchange (PBX), a numeral 74 indicates a public network, and symbols S1 to S2 indicate service areas for the control stations.

As mentioned before, the mobile station 72 communicates with the base stations 71-1 to 71-4, with the transmission power of 10 mW, at the frequency band of 1.9 GHz, by the ADPCM of 32 kbps and TDMA/TDD access method. In the TDMA/TDD method used in the personal handy phone system in Japan, 1 frame of 5 ms comprises 4 timeslots for down link channels from the base station to the mobile station and 4 timeslots for up link channels from the mobile station to the base station, where 1 timeslot is 625 μs. And by transmitting successive frames to each other, the communication between the mobile station and the base station is carried out.

In FIG. 1, the base stations 71-1, 71-2 are connected to the public network 74 through PBX 73, and the base stations 71-3, 71-4 are directly connected to the public network 74. For connections between the base stations 71-1, 71-2 and PBX 73, between PBX 73 and the public network 74, and between the base stations 71-3, 71-4 and the public network 74, ISDN lines are commonly used. A B channel of the ISDN line has a transmission rate of 64 kbps. Therefore, each of the base stations 71-1 to 71-4 needs a conversion function between the 64-kbps B channel of ISDN and a 32-kbps speech channel of ADPCM.

When PBX 73 and the base stations 71-1, 71-2 are provided in a building, the service areas S1, S2 may be formed on each floor by providing the base stations 71-1, 71-2 for each floor. The mobile station 72 in the service areas S1, S2 communicates with a fixed telephone connected to the public network 74 through PBX 73 and the public network 74. The mobile station in the service areas S1, S2 can also communicate with the other mobile stations 72 in the service areas S3, S4 through PBX 73 and the public network 74. The mobile stations 72 in the service area S1 can communicate with the mobile stations 72 in the service areas S2 through PBX 73. And, the mobile stations 72 in the same service area S1, S2 communicate with each other through PBX 73. In the same way, the mobile stations 72 in the service areas S3, S4 communicate with other phones through the public network 74. To manage distributed base stations, a generalizing base station may be provided.

However, there is a problem in the conventional personal handy phone system as described in the following.

In the conventional system using PBX 73, in an office, etc., when the mobile stations 72 in the same service area S1, S2 communicate with each other, the mobile stations 72 are connected to each other by the exchange connection control in the PBX 73. In the conventional system without PBX 73, in the same way, when the mobile stations 72 in the same service area S3, S4 communicate with each other, the mobile stations 72 can be connected to each other through the public network 74. For the case that the mobile stations in the same service area communicate with each other, a method of directly communicating with each other is proposed. However, in this method, it is necessary to set conditions for the direct communication in both mobile stations. Therefore, when the mobile station is not set with the conditions for the direct communication, the mobile station cannot directly communicate with an other mobile station in the same service area because the non-set mobile station cannot be called.

As mentioned above, for the communication between the mobile stations in the same service area, the exchange in the PBX or the switch in the public network are used to perform the communication. Therefore, a processing load in the exchange and the switch increases. More specifically, in the office having no PBX 73, the communication between the mobile stations in the same area 71-3, or 71-4 is carried out through the public network 74, just like the automobile and portable telephone systems. Therefore, a traffic in the public network 74 increases and a whole control operation in the public network 74 is complicated. Further, in this case, since the communication is connected through the switch in the public network 74, a call's fee is charged for the communication based on a communication time.

SUMMARY OF THE INVENTION

It is an object of the present invention to provide a mobile communication system in which a communication between mobile stations in the same service area may be carried out through a base station, in which the disadvantages described above are eliminated.

A more specific object of the present invention is to provide a base station which permits the communication between the mobile stations in the same service area.

The object described above is achieved by a mobile communication system in which a mobile station communicates through a base station connected to a switch system, said base station comprising: a registration memory registering a mobile station located in an area defined by the base station; a switch processing part performing switching and connecting; and a control part; wherein said control part comprises a configuration controlling said switch processing part to connect a calling mobile station and a called mobile station in said area.

The object described above is also achieved by a mobile communication system in which a mobile station communicates through a base station connected to a switch system, said base station comprising: a registration memory registering a mobile station located in an area defined by the base station; a switch processing part performing switching and connecting; and a control part; wherein said control part comprises a configuration transmitting a location-registration request from the mobile station to a system management station, registering the mobile station to said registration memory, and controlling said switch processing part to connect a calling mobile station and a called mobile station when the calling mobile station and the called mobile station in said area defined by the base station are registered in said registration memory.

According to the above mobile communication systems, when the mobile station calls another mobile station in the same area, the control part acknowledges the called mobile station being in the area by referring to the registration memory, and controlling the switch processing part to connect the calling mobile station and the called mobile station. Therefore, a connection control between the mobile stations in the same area may be carried out in only the base station without the switching process of the switch system.

The object described above is also achieved by a mobile communication system in which a mobile station communicates through a base station connected to a switch system, said base station comprising: a registration memory registering a mobile station located in an area defined by the base station; a switch processing part performing switching and connecting; and a control part; wherein said control part comprises: a first configuration previously registering a specified mobile station to said registration memory, sorting the registration memory in response to a location-registration request from the mobile station in the area defined by said base station and setting a flag for the specified mobile station when said mobile station in the area is the specified mobile station; and a second configuration sorting said registration memory in response to a call from a mobile station in said area defined by said base station, and controlling said switch processing part to connect the calling mobile station and a called mobile station when the flag for the called mobile station is set in said registration memory.

According to the above mobile communication system, the control part previously registers the specified mobile station to said registration memory, sorts the registration memory in response to the location-registration request from the mobile station in the area and sets the flag for the specified mobile station when said mobile station in the area is the specified mobile station. Therefore, the base station may easily discriminate whether or not the called mobile station in the area is one of the specified mobile stations, and connects the specified mobile station to the calling mobile station through the switch processing part. Namely, a path between the calling mobile station and the called mobile station may be turned back in the base station.

The object described above is also achieved by the mobile communication system mentioned above, wherein said control part comprises a third configuration controlling said switch processing part to connect a calling mobile station and a called mobile station located in the area defined by said base station when the flags for the calling mobile station and the called mobile station are set in said registration memory instead of said second configuration.

According to the above mobile communication system, in the same way as mentioned in the above systems, the specified mobile stations are registered and flags are set in the registration memory, and when the calling mobile station and the called mobile station are registered in the registration memory and the flags for both stations are set, the calling specified mobile station and the called specified mobile station are connected with each other through the switch processing part. Therefore, for only the specified mobile stations which are previously registered, a turning back connection in the base station may be carried out.

The object described above is also achieved by the mobile communication system mentioned above, wherein said base station comprises: a speech conference processing part summing and distributing speech signals; and a configuration connecting a plurality of mobile stations in said area to said speech conference processing part through said switch processing part, and carrying out a conference call between the plurality of mobile stations in said area.

According to the above mobile communication system, in response to the conference call request, the control part controls the switch processing part to connect the plurality of mobile stations in the same area to the speech conference processing part. As a result, the conference call between the plurality of mobile stations in the same area may be carried out.

The object described above is also achieved by the mobile communication system mentioned above, wherein said base station comprises: a speech conference processing part summing and distributing speech signals; and a configuration connecting a plurality of mobile stations in said area and a line connected to said switch system to said speech conference processing part through said switch processing part, and carrying out a conference call between the plurality of mobile stations in said area and at least one terminal connected to said switch system.

According to the above mobile communication system, in response to the conference call request, the control part controls the switch processing part to connect the plurality of mobile stations in the same area and the line connected to the switch system to the speech conference processing part. As a result, the conference call between the plurality of mobile stations in the same area and other terminals may be carried out.

The object described above is also achieved by a base station, connected to a switch system, for communicating with a mobile station in an area defined by the base station, said base station comprising: a registration memory registering said mobile station located in said area defined by the base station; a switch processing part performing switching and connecting; and a control part referring to said registration memory based on calling information from a calling mobile station located in said area and controlling said switch processing part to connect said calling mobile station and a called mobile station when said called mobile station is in said area.

According to the above base station, the base station registers the mobile stations located in the area to the registration memory, and the control part sorts the registration memory based on the calling information from the mobile station. When the called mobile station is registered, the control part controls the switch processing part to connect the calling mobile station and the responding called mobile station. Therefore, the communication between the mobile stations in the same area may be carried out in only the base station without the switch system.

The object described above is also achieved by the base station mentioned above, wherein said base station further comprises a selection part selecting one of a remote mode transmitting said calling information from the calling mobile station in said area to said switch system and a local mode transmitting said calling information to said control part.

According to the above base station, the selection part is located between the speech processing part and an interface part connected to the switch system, and determines whether or not the switch processing part is connected to the speech processing part. When the speech processing part is directly connected to the interface part, which is referred to the remote mode, the calling information from the mobile station is transmitted to the switch system. While, when the speech processing part is connected to the switch processing part, which is referred to the local mode, the mobile stations in the same area may be connected to each other.

The object described above is also achieved by the base station mentioned above, wherein said control part further comprises a configuration discriminating whether or not the calling mobile station in said area is one of specified mobile stations based on said calling information, and selecting said local mode to control said switch processing part when the calling mobile station is one of the specified mobile stations and selecting said remote mode when the calling mobile station is not one of the specified mobile stations.

According to the above base station, the control part discriminates whether or not the calling mobile station in the area is one of the specified mobile stations based on the calling information. Therefore, when the calling mobile station is the specified mobile station, by the control part, the switch processing part may connect the calling mobile station and the responded called mobile station.

The object described above is also achieved by the base station mentioned above, wherein said base station further comprises: a speech processing part converting a signal between a signal format for said switch system and a signal format for the mobile station; and a bypass switching part bypassing said speech processing part; wherein said control part comprises a configuration discriminating whether the signal from the mobile station is a speech signal or a data signal, and controlling said bypass switching part to bypass said speech processing part when the signal is the data signal.

According to the above base station, the speech processing part may convert the signal between a 64-kbps ISDN format for the switch system and a 32-kbps ADPCM format for the mobile station. When the signal is the data signal, the speech processing part is bypassed by the bypass switching part. Therefore, a content of the data signal may not be changed by the format conversion of the speech processing part.

The object described above is also achieved by the base station mentioned above, wherein said base station further comprises a speech conference processing part summing and distributing speech signals from a plurality of mobile stations, wherein said switch processing part further comprises a configuration connecting said plurality of mobile stations to said speech conference processing part, and said control part further comprises a configuration controlling a connection of the plurality of mobile stations to said speech conference processing part through said switch processing part in response to a conference call request from the mobile station.

According to the above base station, the plurality of mobile stations are connected to the speech conference processing part through the switch processing part in response to the conference call request from the mobile station. The speech conference processing part sums and distributes the speech signals from the plurality of mobile stations. As a result, the conference call between the plurality of mobile stations in the same area may be carried out.

The object described above is also achieved by the base station mentioned above, wherein said base station further comprises a speech conference processing part summing and distributing speech signals from a plurality of mobile stations, wherein said switch processing part further comprises a configuration connecting said plurality of mobile stations and at least one line connected to the switch system to said speech conference processing part, and said control part further comprises a configuration controlling a connection of the plurality of mobile stations and the line connected to the switch system to said speech conference processing part through said switch processing part in response to a conference call request from a terminal.

According to the above base station, the plurality of mobile stations and the line of the switch system are connected to the speech conference processing part through the switch processing part in response to the conference call request from the mobile station. The speech conference processing part sums and distributes the speech signals from the plurality of mobile stations and the line of the switch system. As a result, the conference call may be carried out between the plurality of mobile stations in the same area and other terminals such as other area's mobile stations and fixed telephones.

Other objects and further features of the present invention will be apparent from the following detailed description when read in conjunction with the accompanying drawings.

DESCRIPTION OF THE PREFERRED EMBODIMENTS

Figure 1:
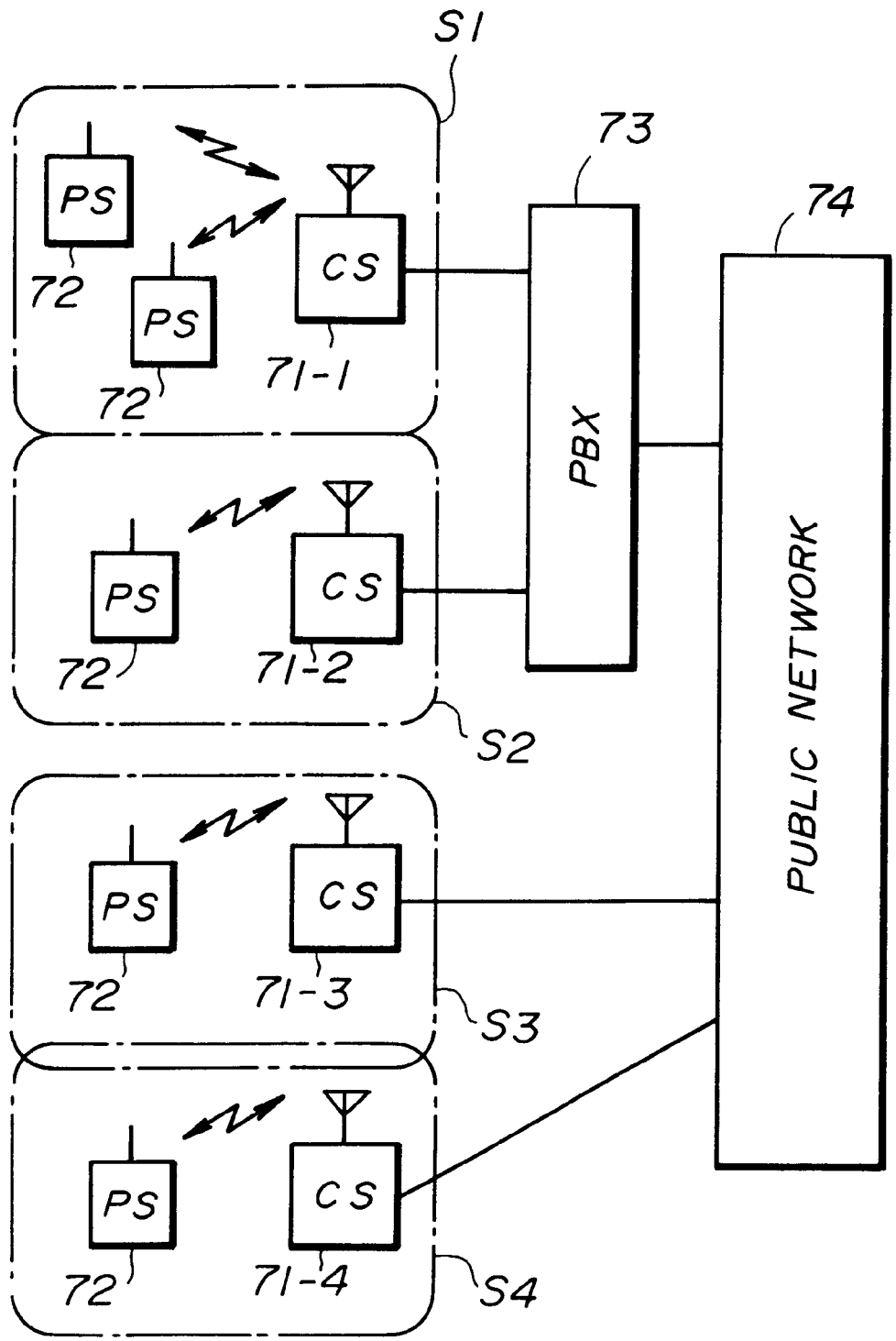
FIG. 1 shows a configuration of a personal handy phone system (PHS) in Japan.
Figure 2:
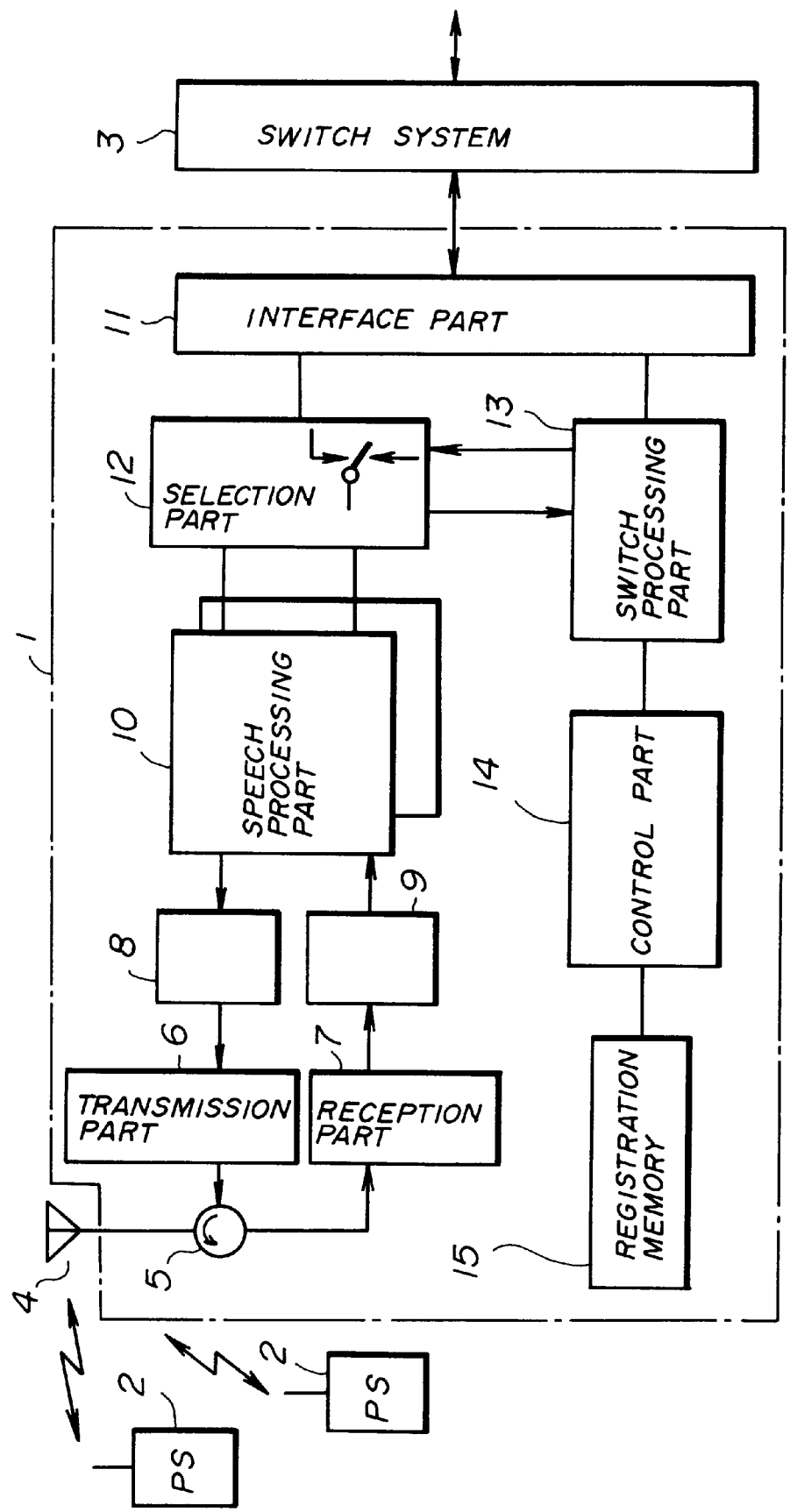
FIG. 2 shows a block diagram of a first embodiment of a mobile communication system according to the present invention.

First, a description will be given of a first embodiment of a mobile communication system according to the present invention. FIG. 2 shows a block diagram of the first embodiment of the mobile communication system according to the present invention. The system comprises a base station 1, portable stations 2 which are commonly referred to as mobile stations, and a switch system 3, for example, a private branch exchange (PBX), and a switch in a public network. The base station 1 comprises an antenna 4, a duplexer 5, a transmission part 6 including a modulator, a reception part 7 including a demodulator, time-division processing parts 8, 9 for a TDMA/TDD method, a speech processing part 10 converting a signal between a 32-kbps ADPCM format and a 64-kbps B-channel format, an interface part 11 connecting with the switch system 3, a selection part 12, a switch processing part 13, a control part 14 controlling the switching processing part 13 and other parts, and a registration memory 15. The 32-kbps ADPCM format is the signal format between the mobile station 2 and the base station 1, and the 64-kbps B-channel format is the signal format between the base station 1 and the switching system 3. As compared with the conventional base station, the selection part 12, the switch processing part 13, the control part 14 and the registration memory 15 are newly added in the base station 1.

The selection part 12 can connect the speech processing part 10 to either of the interface part 11 or the switch processing part 13. When the selection part 12 connects the speech processing part 10 to the interface part 11 by a manual or automatic operation, calling information for establishing a link from the mobile station 2 in a service area defined by the base station 1 is transmitted to the switching system 3 through the antenna 4, the duplexer 5, the reception part 7, the time-division processing part 9, the speech processing part 10, and the interface part 11. This transmission is referred to as a remote mode, and a switch connection is processed in the switching system 3.

When the selection part 12 connects the speech processing part 10 to the switch processing part 13 by the manual or automatic operation, the calling information for establishing the link from the mobile station 2 is transmitted to the control part 14, the transmission being referred to as a local mode. In the local mode, for example, the control part 14 refers to the registration memory 15 and discriminates whether the calling information indicates a signal or not for calling another mobile station in the same service area. When the calling information indicates the signal for calling another mobile station in the same service area, the control part 14 controls the switch processing part 13 to call the another mobile station. In response to the called mobile station, the switch processing part 13 connects the calling mobile station and the called mobile station without going through the switch connection process in the switching system 3. In this way, using only the base station 1, the connection between the mobile stations in the same service area may be permitted.

Figure 3:
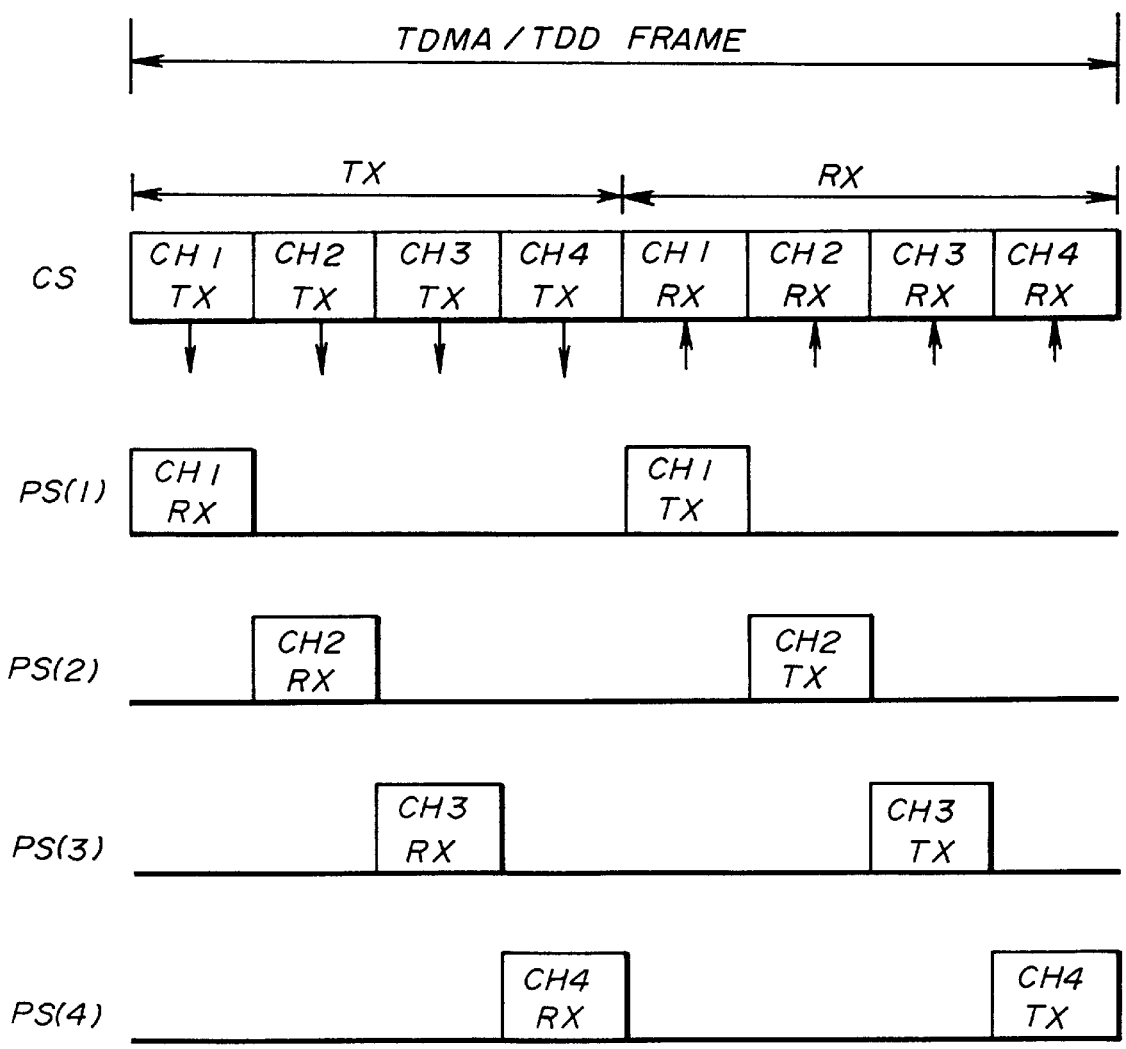
FIG. 3 shows an example of a signal format used in the mobile communication system shown in FIG. 2.

FIG. 3 shows an example of a signal format used in the mobile communication system shown in FIG. 2. The signal format comprises time-divisional frames, each frame being constructed with 4 channels of an uplink from the mobile stations and 4 channels of a downlink to the mobile stations. Therefore, the switch processing part 13 has a relatively simple switching function switching between the 4 channels of the uplink from the mobile stations and the 4 channels of the downlink to the mobile stations. For example, when a path between the first uplink channel and the second downlink channel, and a path between the second uplink channel and the first downlink channel are respectively connected, communication between the mobile stations in the same service area is permitted at the same frequency. In the above signal format, the channels 1, 2 are used for the local mode. The channels 3, 4 are also usable for the remote mode. For such a case, the selection part 12 may select the connections for the remote mode and the local mode for each channel.

The registration memory 15 registers the mobile stations in the service area defined by the base station 1. For example, when power supply in the mobile station 2 is turned on to allow the mobile station 2 to transmit or receive a signal, the mobile station 2 automatically transmits location-registration request information and discriminating information such as an individual number (ID number) of the mobile station 2 to the base station 1. When the base station 1 receives this information, the information is transmitted to the control part 14 through a path which is not shown in FIG. 2. The control part 14 registers the received discriminating information to the registration memory 15.

When the power supply in the mobile station 2 is turned off or the mobile station 2 moves to other service areas, the mobile station 2 transmits a request for erasing the location-registration and the discriminating information. When the base station 1 receives this information, the corresponding location-registration information in the registration memory 15 is erased. In the above registration process, the location-registration information is also transmitted to an upper-level system management station (not shown) through the interface part 11.

Therefore, since the control part 14 can discriminate whether the called mobile station is located or not in the same service area by referring to the registration memory 15, the calling mobile station and the called mobile station in the same service area may be connected with each other by controlling the switch processing part 13 in the base station 1 without transmitting the calling information to the switch system 3. In the case of the mobile station which is not registered in the registration memory 15, the calling information is transmitted to the switch system 3 through the interface part 11.

In the method of discriminating whether or not the mobile station 2 is located in the service area, there is a method of discriminating the mobile station 2 based on a number allotted to the mobile station 2. Namely, the control part 14 discriminates whether or not a number included in the calling information from the mobile station 2 is one of the numbers previously allotted to given mobile stations 2 belonging to the service area. When the number included in the calling information is one of the numbers allotted to the given mobile stations 2, the control part 14 calls the given mobile station 2 in the same service area. In response to the called given mobile station 2, the control part 14 controls the switch processing part 13 to connect the calling mobile station 2 and the called mobile station 2. On the other hand, when the number included in the calling information is not one of the numbers allotted to the given mobile stations 2, the calling information is transmitted to the switch system 3 through the interface part 11.

The above case is applicable to the given mobile stations belonging to the given office. Namely, for the given mobile stations belonging to the given office, the communication between the given mobile stations is permitted through only the same base station 1 without passing through the switch system 3. Therefore, it is possible to eliminate a problem of charging a fee for using the network between the base station 1 and the switch system 3. However, for other mobile stations not belonging to the given office, by passing through the switch system 3, the switch system 3 may charge the fee to the other mobile stations.

A communication system operator (carrier) may charge, for example, a constant fee as a mobile station registration fee for the base station 1. In this way, the problem of the charge for the intra-communication within the same base station 1 may be eliminated. In another method of charging, the base station 1 may have a collecting function of various charging information. In this case, at a given time interval, the collected charging information is transmitted to the upper level system management station (not shown) having a conventional charging control function, and the system management station processes the charging.

In the above case, when the location-registration request is transmitted from the mobile station 2 in the service area of the base station 1, the control part 14 transmits the location-registration information to the above-mentioned system management station and registers it to the registration memory 15. Therefore, the system management station may intensively manage registered numbers of the mobile stations and the locations of the mobile stations in one place. And, when the mobile station 2 in the service area defined by the base station 1 calls the other mobile station, the control part 14 may discriminate whether or not the called mobile station is located in the same area by examining the registration memory 15. When the called mobile station is located in the same service area, the control part 14 controls the switch processing part 13 to connect the calling mobile station and the called mobile station. In this way, a turning back connection in the base station 1 is carried out.

Further, as mentioned above, specified mobile stations may be previously registered in the registration memory 15. When the mobile station transmits the location-registration request, the control part 14 sorts the registration memory 15. If the mobile station is one of the previously registered specified mobile stations, a flag is set to indicate that the specified mobile station is at the same service area. Therefore, after the calling from the mobile station and the sorting of the registration memory 15, when the flag is set for the called mobile station, the called mobile station is the specified mobile station. Thus, the control part 14 controls the switch processing part 13 to connect the calling mobile station and the called mobile station to each other. Namely, when the specified mobile station is called, the turning back connection in the base station 1 is carried out.

The above intra-connection within the base station may also be carried out in another condition. The condition is that both the calling mobile station and the called mobile station are previously registered in the registration memory 15 as the specified mobile stations. In the condition, when the flags for both mobile stations are set to indicate that both mobile station are at the same service area, the control part 14 controls the switch processing part 13 to connect the calling mobile station and the called mobile station to each other. Namely, the mobile stations which are connected in the base station 1 may be limited to the specified mobile station.

Figure 4:
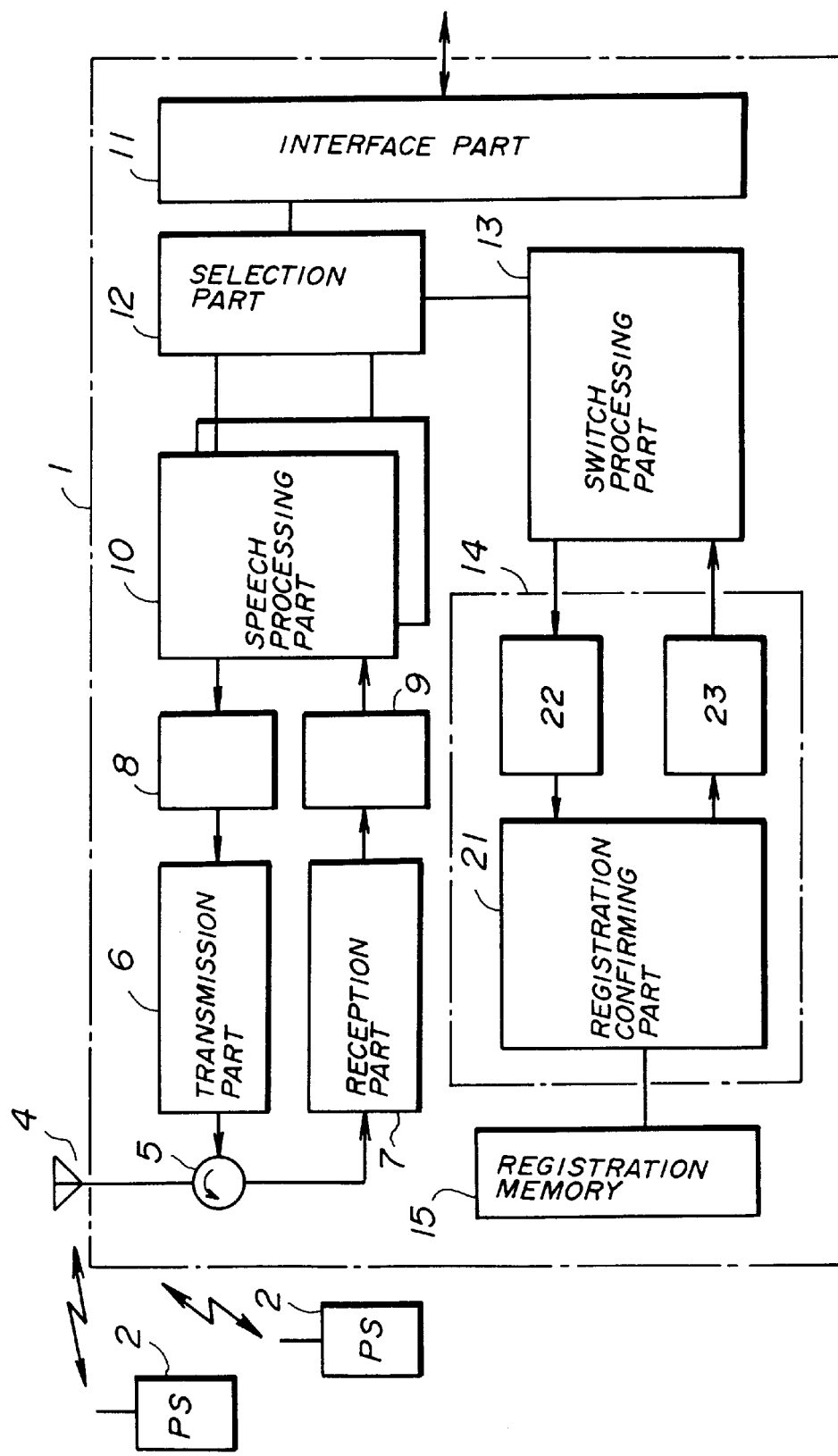
FIG. 4 shows a block diagram of a second embodiment of the mobile communication system according to the present invention.

Next, a description will be given of a second embodiment of the mobile communication system according to the present invention. FIG. 4 shows a block diagram of the second embodiment of the mobile communication system according to the present invention. Elements in FIG. 4 which are the same as those of FIG. 2 are given the same reference numerals. The base station 1 in the second embodiment has a paging function. The control part 14 comprises a registration confirming part 21, a paging-request reception part 22 and a paging-command transmission part 23. The registration confirming part 21 confirms whether or not the mobile station is registered in the registration memory 15. The paging-request reception part 22 receives and processes a paging request from the mobile station 2. The paging-command transmission part 23 transmits a paging command to the mobile station registered in the registration memory 15. In this case, when the paged mobile station is not registered in the registration memory 15, the paging request is transmitted to the switch system 3.

Figure 5:
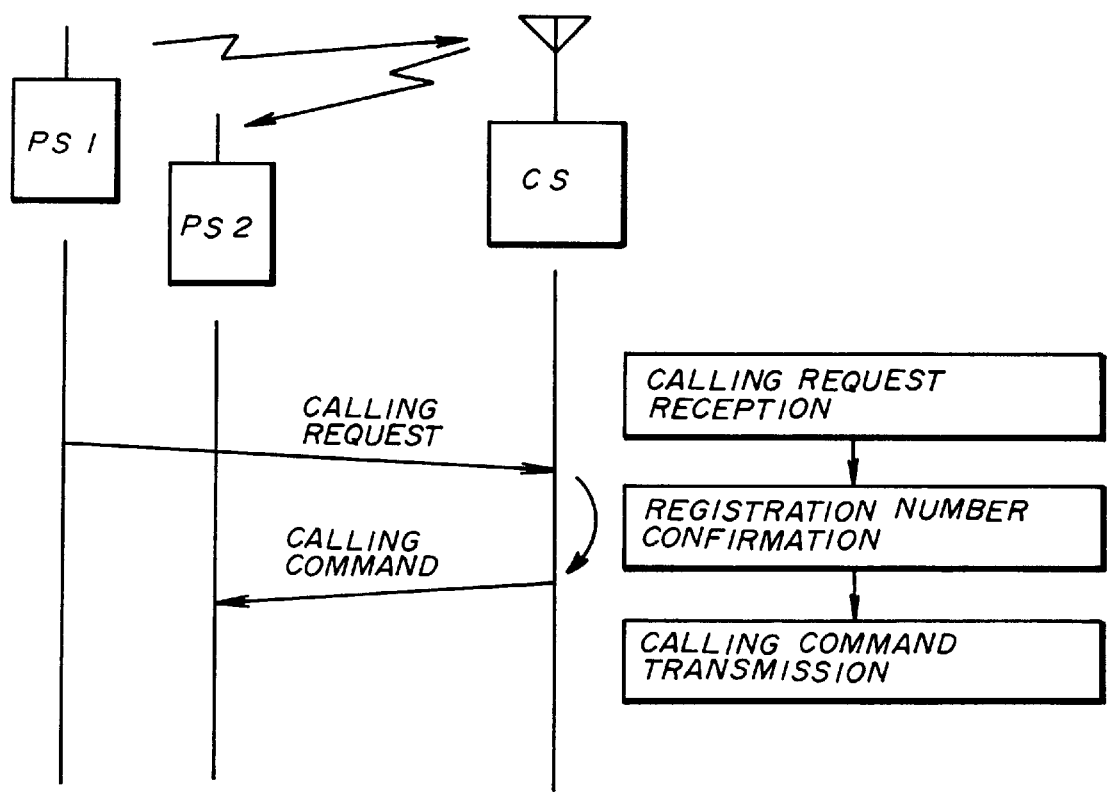
FIG. 5 shows an operation sequence of the second embodiment of the mobile communication system shown in FIG. 4.

FIG. 5 shows an operation sequence of the second embodiment of the mobile communication system shown in FIG. 4. When a mobile station PS1 calls a mobile station PS2 to transmit messages, etc., the mobile station PS1 transmits the number of the mobile station PS2 and the calling request through a control channel to the base station CS. The base station CS receives the calling request and confirms whether or not the mobile station PS2 is registered in the registration memory 15. When the mobile station PS2 is registered, the calling command and the messages are transmitted to the mobile station PS2. In this way, the paging operation may be carried out in the base station without passing through the switch system.

Figure 6:
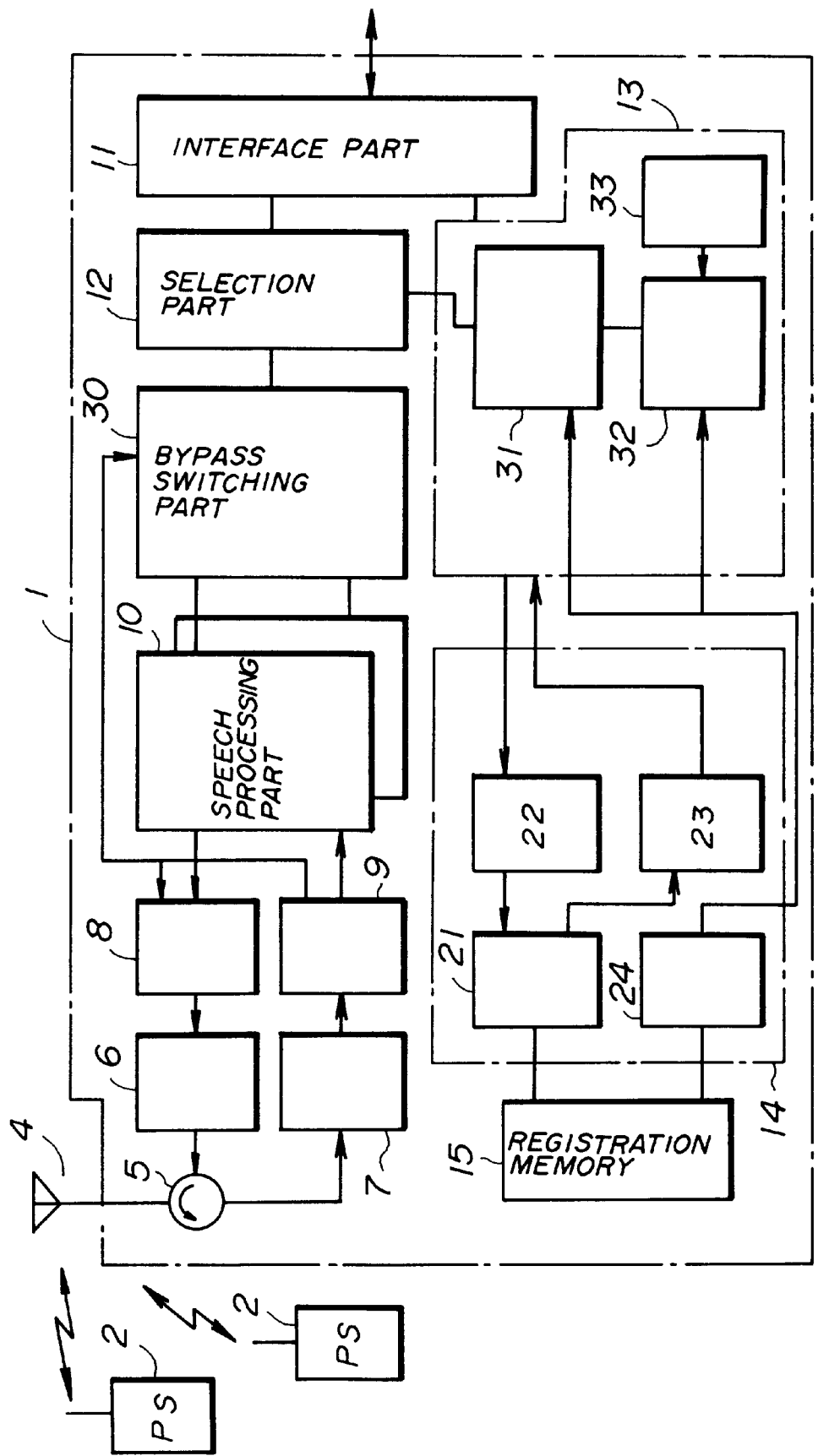
FIG. 6 shows a block diagram of a third embodiment of the mobile communication system according to the present invention.

Next, a description will be given of a third embodiment of the mobile communication system according to the present invention. FIG. 6 shows a block diagram of the third embodiment of the mobile communication system according to the present invention. Elements in FIG. 6 which are the same as those of FIG. 4 are given the same reference numerals. A bypass switching part 30 is added between the speech processing part 10 and the selection part 12. The switch processing part 13 comprises a line connection part 31, a buffering part 32 and a timing generation part 33. The control part 14 further comprises a communication-line control part 24.

The bypass switching part 30 is controlled by the control part 14 through a path which is not shown to bypass the speech processing part 10. As mentioned before, the speech processing part 10 converts the speech signal between the 64-kbps format in the ISDN side and the 32-kbps format in the ADPCM side. If data is converted in such a manner, a content of the data is broken. Therefore, for the data communication, the function of the speech processing part 10 needs to be stopped or bypassed.

In the switch processing part 13, the line connection part 31 switches and connects each channel, the buffering part 32 buffers the speech signal and the data, and the timing generation part 33 generates a timing of the transmission and the reception. The mobile station 2 has a function of receiving, transmitting and processing the data. Therefore, the data communication is permitted between the mobile stations 2.

In the control part 14, the communication-line control part 24 refers to the registration memory 15 based on the calling information from the mobile station in the service area. When the called mobile station is registered in the registration memory 15, the communication control part 24 controls the line connection part 31 to connect the calling mobile station and the called mobile station to each other, and controls the buffering part 32 to buffer the transmitted and received speech signal and data. The control part 14 discriminates whether the communication is the speech communication or the data communication. In the case of the data communication, as mentioned before, the bypass switching part 30 is controlled to bypass the speech processing part 10.

When the communication-line control part 24 confirms that the called mobile station is registered in the registration memory 15 based on the calling information, the communication-line control part 24 controls the line connection part 31 to connect the calling mobile station and the called mobile station to each other.

Figure 7:
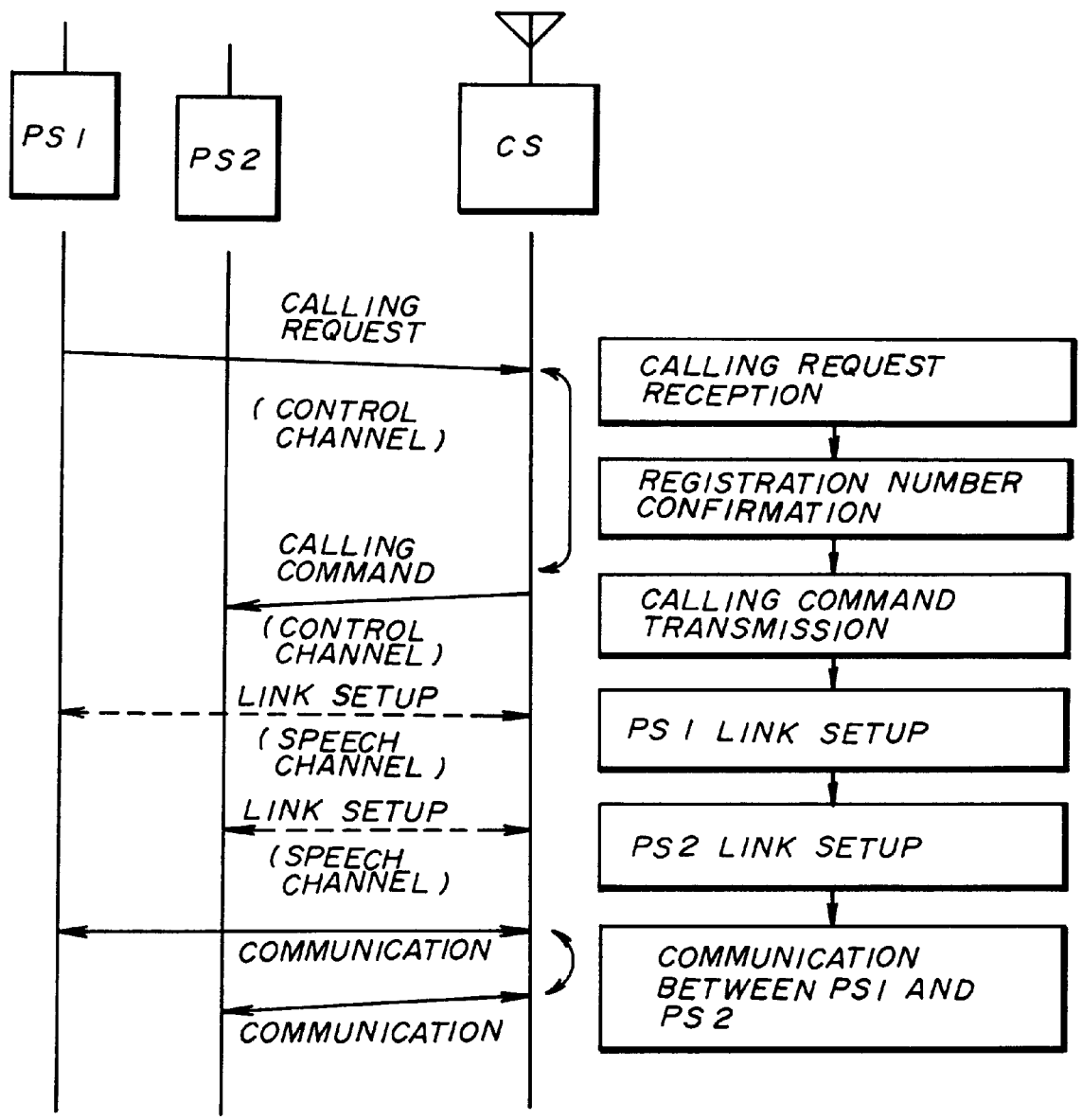
FIG. 7 shows an operation sequence of the third embodiment of the mobile communication system shown in FIG. 6.

FIG. 7 shows an operation sequence of the third embodiment of the mobile communication system shown in FIG. 6. The accompanying process steps in the base station CS are shown in the right side of FIG. 7. FIG. 7 shows a case that the speech or data communication is carried out between the mobile stations PS1, PS2 through the base station CS. For example, when the mobile station PS1 transmits a calling request for calling the mobile station PS2 through the control channel, if the base station CS receives the calling request and confirms that the mobile station PS2 is registered in the registration memory 15, the base station CS transmits the calling command to the mobile station PS2 through the control channel. In response to the mobile station PS2, the base station CS establishes synchronizations of the respective speech channels between the base station CS and the mobile stations PS1, PS2. When the synchronizations of the speech channels are established as shown in "PS1 LINK SETUP", "PS2 LINK SETUP", the communication between the mobile stations PS1, PS2 is carried out through the base station CS.

In the above sequence, the communication is determined to be the data communication, the speech processing part 10 is bypassed by the bypass switching part 30, and the data is communicated between the mobile stations without being converted to another format.

Figure 8:
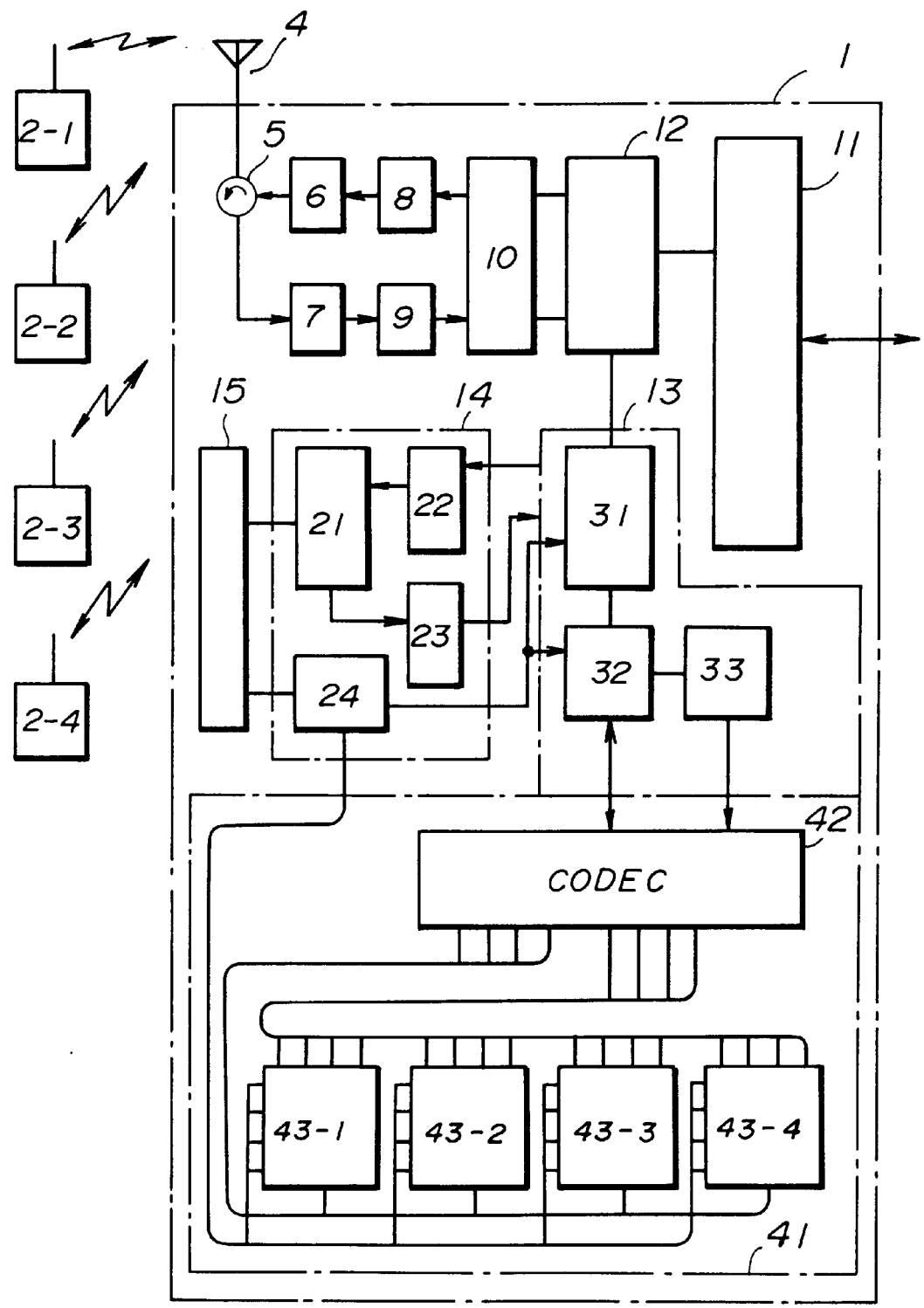
FIG. 8 shows a block diagram of a fourth embodiment of the mobile communication system according to the present invention.

Next, a description will be given of a fourth embodiment of the mobile communication system according to the present invention. FIG. 8 shows a block diagram of the fourth embodiment of the mobile communication system according to the present invention. Elements in FIG. 8 which are the same as those of FIG. 6 are given the same reference numerals. The base station 1 can simultaneously communicate with mobile stations 2-1 to 2-4. To the base station 1, a speech conference processing part 41 is added, which includes a codec (coder/decoder) part (CODEC) 42 and hybrid circuits 43-1 to 43-4.

In the speech conference processing part 41, the codec part 42 converts a signal between a digital speech signal and an analog speech signal, each of the hybrid circuits 43-1 to 43-4 sums the analog speech signals of participants of the conference and transmits to a receiving person the sum minus the analog speech signal of the receiving person. When the participants of the conference call are A, B, C, and D, by the control of the line control part 24 in the control part 14, the hybrid circuit 43-1 sums the analog speech signals of B, C and D and transmits the sum to A, the hybrid circuit 43-2 sums the analog speech signals of A, C and D and transmits the sum to B, the hybrid circuit 43-3 sums the analog speech signals of A, B and D and transmits the sum to C, and the hybrid circuit 43-4 sums the analog speech signals of A, B and C and transmits the sum to D. Though the analog speech signals are summed together in the above example, the digital speech signals may be summed in the codec part 42. In this case, the digital speech signal which is coded based on a companding method is converted a signal based on a linear coding method, and by a digital signal processing known as an N-1 summing method, the summing and distributing are carried out.

When the control part 14 receives a setup request of the conference call from the mobile station, the control part 14 controls the switch processing part 13 to connect with the speech conference processing part 41. To set up the conference call, there are some sequences. A first sequence example is that the mobile station transmits a special number for the conference call and the numbers of the mobile stations and the base station 1 successively calls the mobile stations. A second sequence example is that the mobile stations transmit the special number for the conference at a predetermined time, and the base station 1 connects the speech conference processing part through the switch processing part 13 to set up the conference call.

Figure 9:
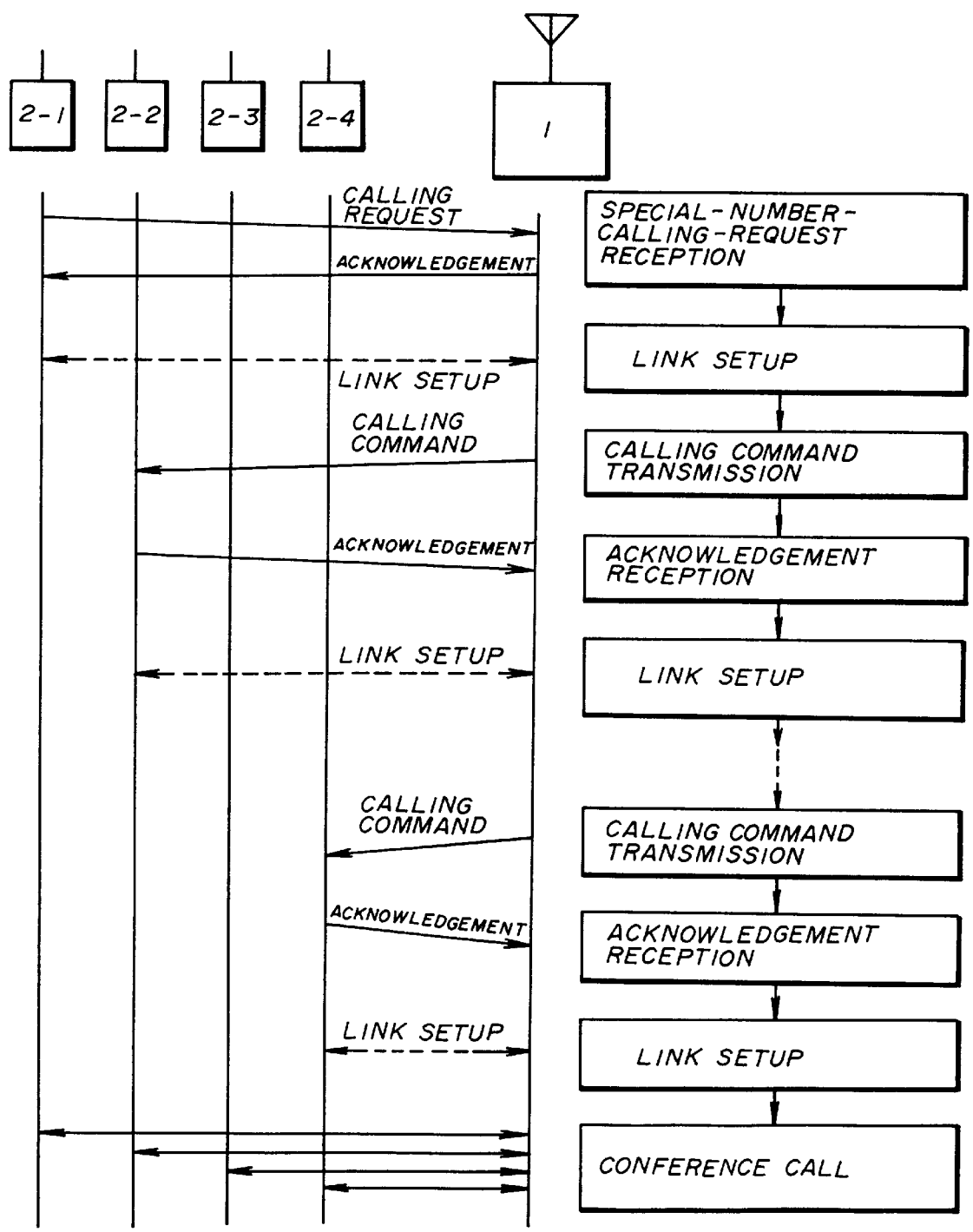
FIG. 9 shows an operation sequence of the fourth embodiment of the mobile communication system shown in FIG. 8.

FIG. 9 shows an operation sequence of the fourth embodiment of the mobile communication system shown in FIG. 8. The sequence shows a case that the conference call is set up for the mobile stations 2-1 to 2-4, and the accompanying process steps are shown in the right side in FIG. 9. When the mobile station 2-1 transmits the special number for setting up the conference call and the numbers indicating the participants of the conference call to the base station 1 through the control channel, the base station 1 receives the numbers and transmits an acknowledgement to the mobile station 2-1 through the control channel. And subsequently, the base station 1 establishes the synchronization of the speech channel between the mobile station 2-1 and the base station 1. After that, the base station 1 calls the mobile station 2-2 which is called from the mobile station 2-1. In response to the mobile station 2-2, the synchronization of the speech channel between the mobile station 2-2 and the base station 1 is established.

In the same way, the mobile stations 2-3, 2-4 are called from the base station 1, and after the responses, the speech channel synchronizations are respectively established. As a result, the conference call between the mobile stations 2-1 to 2-4 can be carried out through the speech conference processing part 41 in the base station 1. Namely, the conference call between a plurality of mobile stations in the same service area may be carried out without the processing in the switch system 3.

Figure 10:
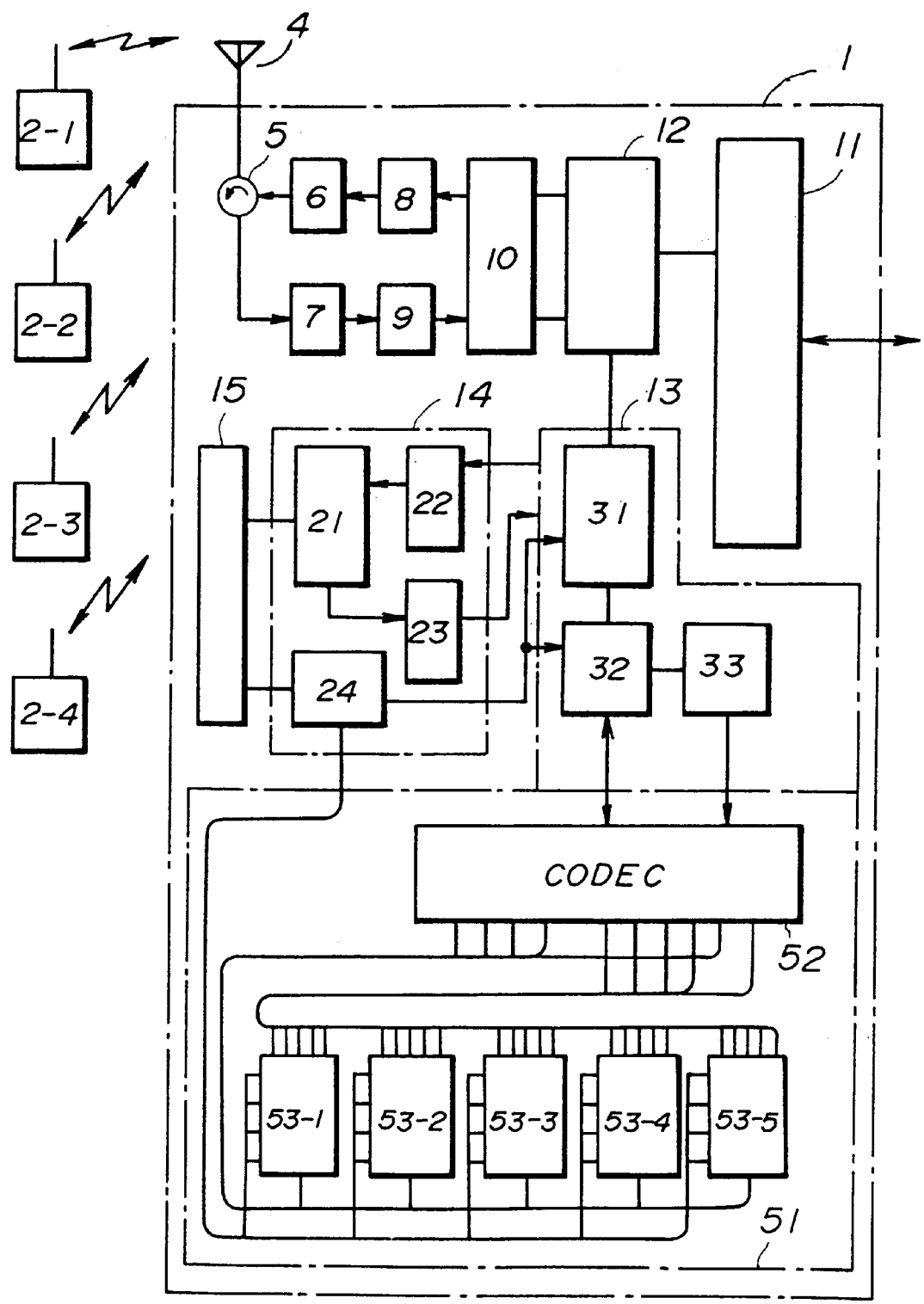
FIG. 10 shows a block diagram of a fifth embodiment of the mobile communication system according to the present invention.

Next, a description will be given of a fifth embodiment of the mobile communication system according to the present invention. FIG. 10 shows a block diagram of the fifth embodiment of the mobile communication system according to the present invention. Elements in FIG. 10 which are the same as those of FIG. 8 are given the same reference numerals. The base station 1 can simultaneously communicate with mobile stations 2-1 to 2-4. To the base station 1, a speech conference processing part 51 is added, which includes a codec part (CODEC) 52 and hybrid circuits 53-1 to 53-5. Each of the hybrid circuits 53-1 to 53-5 sums the analog speech signals of participants of the conference except the analog speech signal of the receiving person, and transmits the sum. Also in this case, the summing circuit may be constructed with the digital signal processing circuits.

In the fifth embodiment, lines connected to the switch system 3 through the interface part 11 can be connected to the speech conference processing part 51. Namely, the conference call may be carried out between the mobile stations 2-1 to 2-4 in the service area defined by the base station 1 and other terminals such as mobile stations in other areas and fixed telephones in the public network. The speech conference processing part 51 may be constructed with the hybrid circuits corresponding to the 4 mobile stations 2-1 to 2-4 in the same service area and the hybrid circuits corresponding to the lines from the switch system 3. In the case of the speech conference processing part 51 shown in FIG. 10, one line from the switch system 3 is used. Thus, the hybrid circuit 53-3 is added for the line from the switch system 3.

Figure 11:
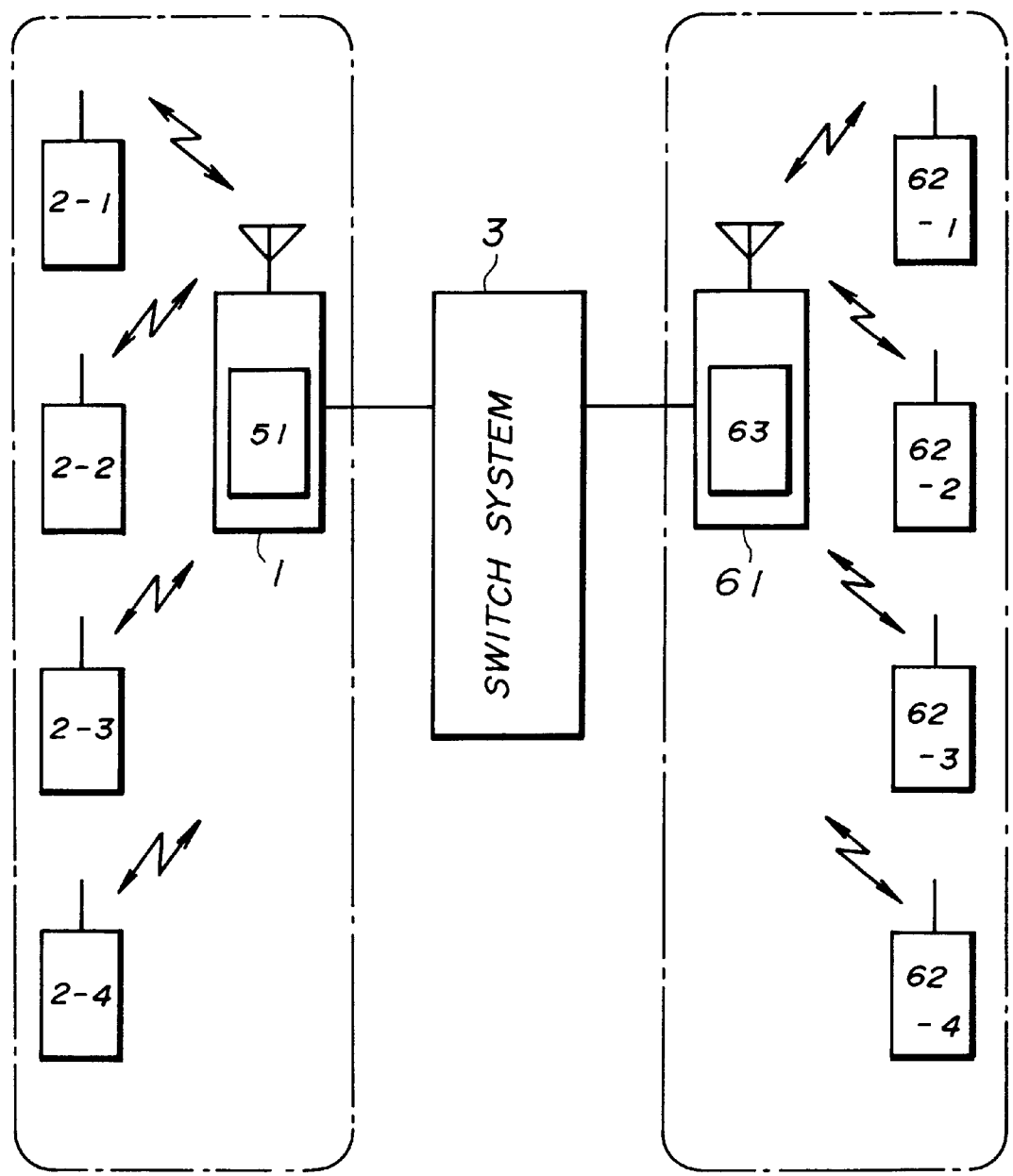
FIG. 11 shows an illustration for explaining a system configuration of the fifth embodiment of the mobile communication system shown in FIG. 10.

FIG. 11 shows an illustration for explaining a system configuration of the fifth embodiment of the mobile communication system shown in FIG. 10. In FIG. 11, a base station 61 is connected to the switch system 3, and defines the service area in which mobile stations 62-1 to 62-4 are located. In the system, the conference call is carried out between the mobile stations 2-1 to 2-4 and 62-1 to 62-4 in the service areas of the base stations 1, 61.

For the mobile stations 2-1 to 2-4 in the service area defined by the base station 1, as mentioned before by referring to FIGS. 8 and 9, according to a request for setting up the conference call from one of the mobile stations 2-1 to 2-4 and 62-1 to 62-4, the called mobile stations successively respond to the request. And, the speech conference processing part 52 is connected to the communication line through the switch processing part 13. In the same way, for the mobile stations 62-1 to 62-4 in the service area defined by the base station 61, according to the request for setting up the conference call from the one of the mobile stations 2-1 to 2-4 and 62-1 to 62-4, the called mobile stations successively respond the request. And, in the base station 61, the speech conference processing part 63 is connected to the communication line through the switch processing part.

The speech conference processing part 51 sums and distributes the speech signals from the mobile stations 2-1 to 2-4 and a speech signal of the line from the switch system 3. Meanwhile, the speech conference processing part 63 sums and distributes the speech signals from the mobile stations 62-1 to 62-4 and a speech signal of the line from the switch system 3. Therefore, since the speech signals of the plurality of mobile stations in another service area are summed to be transmitted, a number of lines to be connected to the switch system 3 may be merely one.

Figure 12:
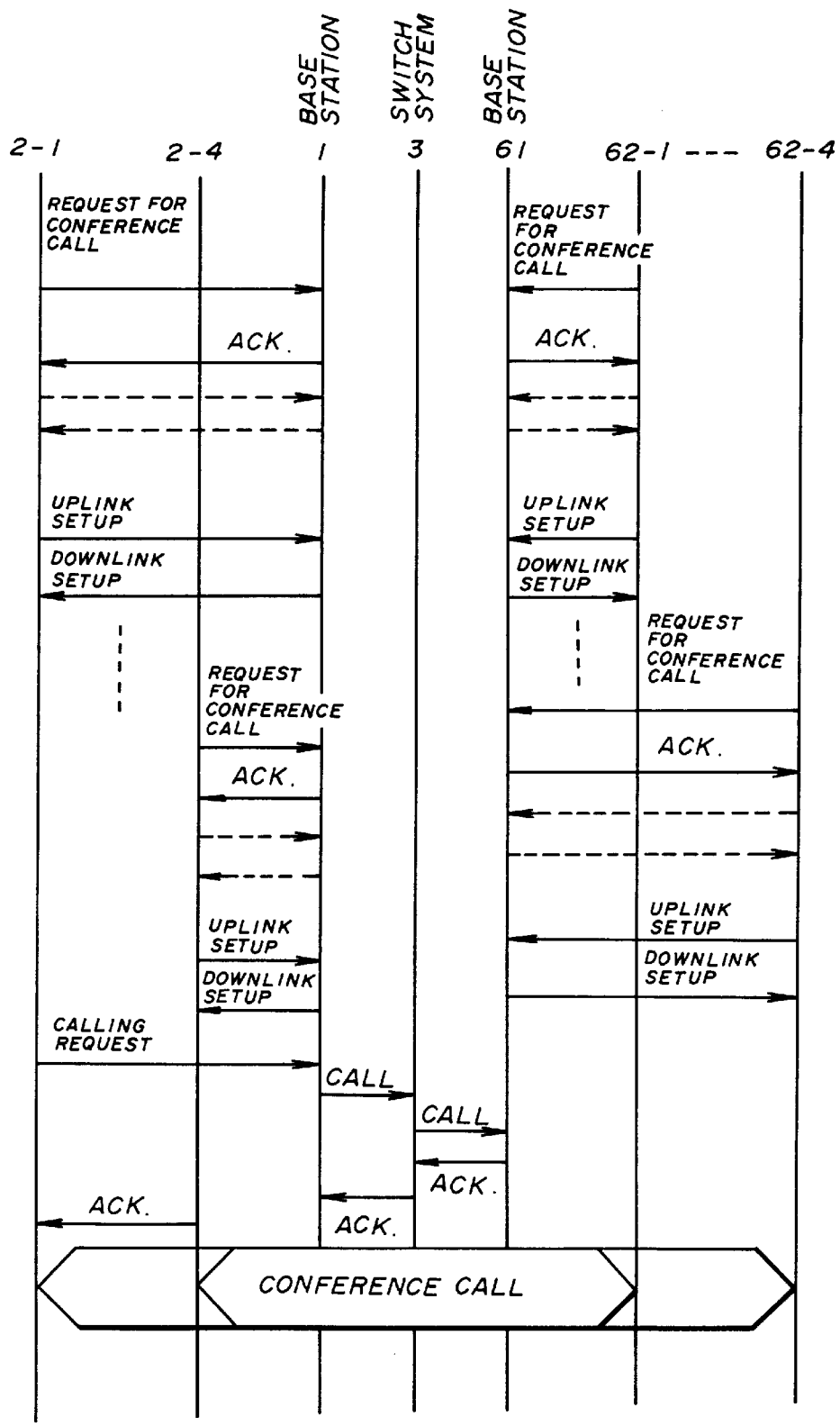
FIG. 12 shows an operation sequence of the fifth embodiment of the mobile communication system shown in FIG. 10.

FIG. 12 shows an operation sequence of the fifth embodiment of the mobile communication system shown in FIG. 10. In FIG. 12, the sequence is illustrated in the same configuration as that shown in FIG. 11. The base stations 1, 61 are connected to the switch system 3, and the mobile stations 2-1 to 2-4 are located in the service area defined by the base station 1, and the mobile stations 62-1 to 62-4 are located in the service area defined by the base station 61. The sequence shown in FIG. 12 shows the case that each mobile station requests setting up the conference call.

For example, first, the mobile station 2-1 requests setting up the conference call with the special number through the control channel, and the base station 1 returns an acknowledgement and establishes the links of the speech channel as shown by the dashed lines. Namely, thereby, the uplink channel from the mobile station 2-1 to the base station 1 and the downlink channel from the base station 1 to the mobile station 2-1 are established. In the same way, the mobile stations 2-2 to 2-4 request setting up the conference call, and, thus, the speech channels between the base station 1 and the mobile stations 2-2 to 2-4 are established.

Meanwhile, in the base station 61, in the same way as that in the base station 1, the mobile stations 62-1 to 62-4 successively request setting up the conference call, and, thus, the base station 61 returns the acknowledgement and establishes the speech channel. As a result, the uplink channels and the downlink channels between the base station 61 and the mobile stations 62-1 to 62-4 are established.

Further, for example, when the mobile station 2-1 transmits the calling request for the base station 61 with the special number, the base station 1 transmits the calling request information to the switch system 3. The switch system 3 calls the base station 61 according to the calling request information, and in response to the base station 61, the acknowledgement is returned to the mobile station 2-1.

As a result, the base stations 1, 61 are connected to each other through one line of the switch system 3. Accordingly, the conference call may be performed between the 8 mobile stations 2-1 to 2-4, 62-1 to 62-4 in the service areas of the base stations 1, 61.

The present invention is not limited to these embodiments. For example, the conference call with the various terminals including the fixed telephones as well as the mobile telephones may be carried out by using the mobile communication system according to the present invention. In the above embodiments, the descriptions of the present invention have been given by referring to the personal handy phone system in Japan. However, the present invention is not limited to the embodiments of the personal handy phone system, and is applicable to the conventional cellular systems and the base stations used therein.

As described above, the present inventions have the following features.

In the mobile communication system according to the present invention, the control part 14 and the switch processing part 13 are provided in the base station 1 to connect the calling mobile station and the called mobile station in the same service area to each other without passing the switch system 3. Therefore, a process load applied to the switch system may be reduced. Since the mobile station in the service area is registered in the registration memory, the connection control between the mobile stations in the same service area may be carried out at a higher speed.

And, the conference call between the plurality of mobile stations in the same service area may be carried out in only the base station 1 without passing through the switch system 3. Therefore, for also the process of setting up the conference call, the process load applied to the switch system 3 may be reduced. Further, by connecting the other base station through the switch system, the conference call set up in one service area and the conference call set up in the other service area may be connected through one line. As a result, the conference call may be realized between the plurality of mobile stations in the different service areas. In this case, the number of lines necessary for connecting the different service areas to each other may be reduced, for example, to one line.

Furthermore, in the base station 1, the relatively simple switch processing part 13, the control part 14 controlling it, and the registration memory 15 are provided. Thereby, the mobile stations 2 in the same service area defined by the base station 1 may be connected to each other without passing through the switch system 3. For the data communication, by bypassing the speech processing part for converting the signal format, the data communication by the mobile station may be easily carried out. Further, by providing the speech conference processing part to the base station 1, the conference call between the mobile stations 2 in the service area of the base station 1 may be carried out without passing through the switch system 3.

Further, the present invention is not limited to these embodiments, but various variations and modifications may be made without departing from the scope of the present invention.

What is claimed is:

1. A mobile communication system in which a mobile station communicates through a base station connected to a switch system, comprising:

a registration memory registering a specified mobile station located in an area defined by the base station;

a switch processor performing switching and connecting; and a controller for setting a flag for the specified mobile station in the registration memory when a mobile station in the area defined by the base station is the specified mobile station and for controlling said switch processor to connect a calling mobile station and a called mobile station in said area when the flag is set;

wherein said registration memory, said switch processor and said controller are located in said base station, so that a switching operation between mobile stations in said area can be performed by said base station without said switch system.

2. The mobile communication system as claimed in claim 1, further comprising:

a speech conference processor positioned in said base station and summing and distributing speech signals; and a configuration positioned in said base station and connecting a plurality of mobile stations in said area to said speech conference processor through said switch processor, and carrying out a conference call between the plurality of mobile stations in said area.

3. The mobile communication system as claimed in claim 1, further comprising:

a speech conference processor positioned in said base station and summing and distributing speech signals; and a configuration positioned in said base station and connecting a plurality of mobile stations in said area and a line connected to said switch system to said speech conference processor through said switch processor, and carrying out a conference call between the plurality of mobile stations in said area and at least one terminal connected to said switch system.

4. A mobile communication system in which a mobile station communicates through a base station connected to a switch system, comprising:

a registration memory registering a specified mobile station located in an area defined by the base station;

a switch processor performing switching and connecting; and a controller;

wherein said controller comprises a configuration transmitting a location-registration request from a mobile station to a system management station, setting a flag for the specified mobile station in the registration memory when the mobile station transmitting the location-registration request is the specified mobile station, and for controlling said switch processor to connect a calling mobile station and a called mobile station when the flag is set;

said registration memory, said switch processor and said controller being located in said base station so that a switching operation between mobile stations in said area can be performed by said base station without said switch system.

5. The mobile communication system as claimed in claim 4, and further comprising:

a speech conference processor positioned in said base station and summing and distributing speech signals; and a configuration positioned in said base station and connecting a plurality of mobile stations in said area to said speech conference processor through said switch processor, and carrying out a conference call between the plurality of mobile stations in said area.

6. The mobile communication system as claimed in claim 4, and further comprising:

a speech conference processor positioned in said base station and summing and distributing speech signals; and a configuration positioned in said base station and connecting a plurality of mobile stations in said area and a line connected to said switch system to said speech conference processor through said switch processor, and carrying out a conference call between the plurality of mobile stations in said area and at least one terminal connected to said switch system.

7. A mobile communication system in which a mobile station communicates through a base station connected to a switch system, comprising:

a registration memory registering a mobile station located in an area defined by the base station;

a switch processor performing switching and connecting; and a controller;

wherein said controller includes:

a first configuration previously registering a specified mobile station to said registration memory, sorting the registration memory in response to a location-registration request from the mobile station in the area defined by said base station and setting a flag for the specified mobile station when said mobile station in the area is the specified mobile station; and a second configuration sorting said registration memory in response to a call from a mobile station in said area defined by said base station, and controlling said switch processor to connect the calling mobile station and a called mobile station when the flag for the called mobile station is set in said registration memory;

said registration memory, said switch processor and said controller being located in said base station so that a switching operation between mobile stations in said area can be performed by said base station without said switch system.

8. The mobile communication system as claimed in claim 7, wherein said controller comprises a third configuration controlling said switch processor to connect a calling mobile station and a called mobile station located in the area defined by said base station when the flags for the calling mobile station and the called mobile station are set in said registration memory instead of said second configuration.

9. A base station, connected to a switch system, for communicating with a specified mobile station in an area defined by the base station, comprising:

a registration memory registering the specified mobile station located in said area defined by the base station;

a switch processor performing switching and connecting; and a controller referring to said registration memory based on calling information from a calling mobile station located in said area, setting a flag for the specified mobile station in the registration memory when said calling mobile station is the specified mobile station and for controlling said switch processing part to connect said calling mobile station and a called mobile station when the flag is set;

said registration memory, said switch processor and said controller being placed in said base station so that a switching operation between said calling mobile station and said called mobile station can be performed by said base station without said switch system.

10. The base station as claimed in claim 9, wherein said base station further comprises a selector for selecting one of a remote mode transmitting said calling information from the calling mobile station in said area to said switch system and a local mode transmitting said calling information to said controller.

11. The base station as claimed in claim 10, wherein said controller further comprises a configuration discriminating whether or not the calling mobile station in said area is one of specified mobile stations based on said calling information, and selecting said local mode to control said switch processor when the calling mobile station is one of the specified mobile stations and selecting said remote mode when the calling mobile station is not one of the specified mobile stations.

12. The base station as claimed in claim 9, wherein said base station further comprises:

a speech processor converting a signal between a signal format for said switch system and a signal format for the mobile station; and a bypass switch for bypassing said speech processing part;

wherein said controller comprises a configuration discriminating whether the signal from the mobile station is a speech signal or a data signal, and controlling said bypass switch to bypass said speech processor when the signal is the data signal.

13. The base station as claimed in claim 9, wherein said base station further comprises a speech conference processor for summing and distributing speech signals from a plurality of mobile stations, wherein said switch processor further comprises a configuration connecting said plurality of mobile stations to said speech conference processor, and said controller further comprises a configuration controlling a connection of the plurality of mobile stations to said speech conference processor through said switch processor in response to a conference call request from the mobile station.

14. The base station as claimed in claim 9, wherein said base station further comprises a speech conference processor for summing and distributing speech signals from a plurality of mobile stations, wherein said switch processor further comprises a configuration connecting said plurality of mobile stations and at least one line connected to the switch system to said speech conference processor, and said controller further comprises a configuration controlling a connection of the plurality of mobile stations and the line connected to the switch system to said speech conference processor through said switch processor in response to a conference call request from a terminal.

15. A mobile communication system in which a mobile station communicates through a base station connected to a switch system, comprising:

a registration memory registering a mobile station located in an area defined by the base station;

a switch processor performing switching and connecting; and controller including:

a first configuration previously registering a specified mobile station to said registration memory, sorting the registration memory in response to a location-registration request from the mobile station in the area defined by said base station and setting a flag for the specified mobile station when said mobile station in the area is the specified mobile station;

a second configuration sorting said registration memory in response to a call from a mobile station in said area defined by said base station, and controlling said switch processor to connect the calling mobile station and a called mobile station when the flag for the called mobile station is set in said registration memory;

a speech conference processor summing and distributing speech signals; and a configuration connecting a plurality of mobile stations in said area to said speech conference processor through said switch processor, and carrying out a conference call between the plurality of mobile stations in said area;

said registration memory, said switch processor and said controller being located in said base station so that a switching operation between the plurality of mobile stations in said area can be performed by said base station without said switch system.

\* \* \* \* \*